Dec. 28, 1943.   E. C. SLOAN ET AL   2,337,574
FILTER AND METHOD FOR MAKING THE SAME
Filed July 15, 1938   6 Sheets-Sheet 1

Inventors.
Edward C. Sloan,
and Augustus H. Eberman,
By Parkinson & Lane Attys Witness:
Chas. K. Koush.

Dec. 28, 1943.  E. C. SLOAN ET AL  2,337,574
FILTER AND METHOD FOR MAKING THE SAME
Filed July 15, 1938  6 Sheets-Sheet 4

Inventors
Edward C. Sloan
and Augustus H. Eberman
By Parkinson + Lane, Attys.

Witness:
Chas. E. Koursh.

Patented Dec. 28, 1943

2,337,574

UNITED STATES PATENT OFFICE 2,337,574

FILTER AND METHOD FOR MAKING THE SAME

Edward C. Sloan and Augustus H. Eberman, Geneva, Ill., assignors to Jesse B. Hawley, Geneva, Ill.

Application July 15, 1938, Serial No. 219,454

13 Claims. (Cl. 210—204)

This invention relates to filters adapted for filtering oil and other fluids and made from accreted fibrous pulp, and also to the apparatus and method for making the same.

Our invention comprehends a filtering member that is economical to manufacture, simple in construction, of ample strength, efficient in operation, easy of replacement, and yet one that can be thrown away and quickly replaced with a new one at low cost when required.

Our invention further includes a filtering member that is made of fibrous pulp accreted onto a form from a pulp bath, novel folding means for folding the wet pulp carcass into the desired form after being accreted, means for handling the folded wet carcass, and transferring means for transferring the wet carcass from one part to the other during its production.

Our invention further comprehends a novel process for forming filter members accreted from fibrous pulp, and so treated as to improve the wet-strength both during and after the folding operation by increasing the interlocking and holding capacity of the fibres, and at the same time such that will permit the oil or other liquid being filtered to pass through the filter with the proper degree of rapidity. Also to make possible the making of a filter member of considerable strength either with or without treatment for increasing the wet strength.

Our invention also contemplates the combination of our improved filter members and filters with the oil circulating system in internal combustion engines, oil burners and other devices to which it may be adapted, for removing the dirt, grit and foreign substances from the oil, and thus prolonging the usefulness of both the oil and the device being lubricated, or the device to which the oil is being supplied. It may also be used for filtering other liquids, as well as separating one liquid from another.

Further included in our invention is the addition to the fibrous bath of an alkali or alkalies which will so act upon the fibres in the bath that the fibres in the filter member during its use will neutralize the acid that may be present in the oil being filtered. Also such alkali will swell the fibres in the bath so that swelling of the fibres will not be caused by the oil being filtered during use of the filter member. The addition of such alkali to the bath will also make the fibres more stable so that they will not become injuriously affected during operating of the filter to lessen their efficiency.

Our invention further includes the formation of the wet carcass onto a form and then increasing the size of the carcass to such extent that it can be removed from the form or mold and during drying will shrink to a predetermined desired size.

Our invention also includes the formation on the surface of the parts of the filter member of valleys, furrows, grooves, ridges and the like, either straight or irregular, such that the rough or irregular surfaces will permit the passage in a general longitudinal direction of the oil or other liquid being filtered when said surfaces are in direct contact with other faces such as the interior walls of the filter casing, other of said surfaces, and the like, thus eliminating the necessity of separate supporting members.

Other objects, advantages and capabilities inherently possessed by this invention will later become more readily apparent.

The filter elements of the present invention are made from fibrous material such as vegetable, mineral or animal fibres, and preferably vegetable fibres such as cotton fibres, wood fibres or the like. Also asbestos fibres, and synthetic or artificial fibres and other suitable fibres may be used if desired, one of the requisite conditions being that the fibrous material used be capable of being made into porous form. Also, if desired, any mixtures of the foregoing may be used as found suitable.

The formation of our improved filter members is accomplished in general by first accreting onto a suitable perforated form from a bath of fibres a wet carcass of the desired thickness and elongated, but having a plurality of cylindrical portions, each succeeding cylindrical portion being greater in diameter than the preceding cylindrical portion and of such length that while still wet this carcass will be folded into collapsed form, with the cylindrical portions of different diameters concentric to each other but integrally connected together. After the carcass is felted onto the felting form the latter is raised out of the bath and the carcass removed from the felting form by a transferrer, by which it is transferred to the folder and folded while wet into the shape referred to. While we have shown in the drawings the various cylindrical portions as being of cylindrical outer contour except for two that are longitudinally fluted, we wish it understood that these portions of different diameter may be of any suitable cross-section other than cylindrical, such as square, oblong, elliptical, rectangular or, if desired, of irregular contour.

Figures 1, 2, 3:
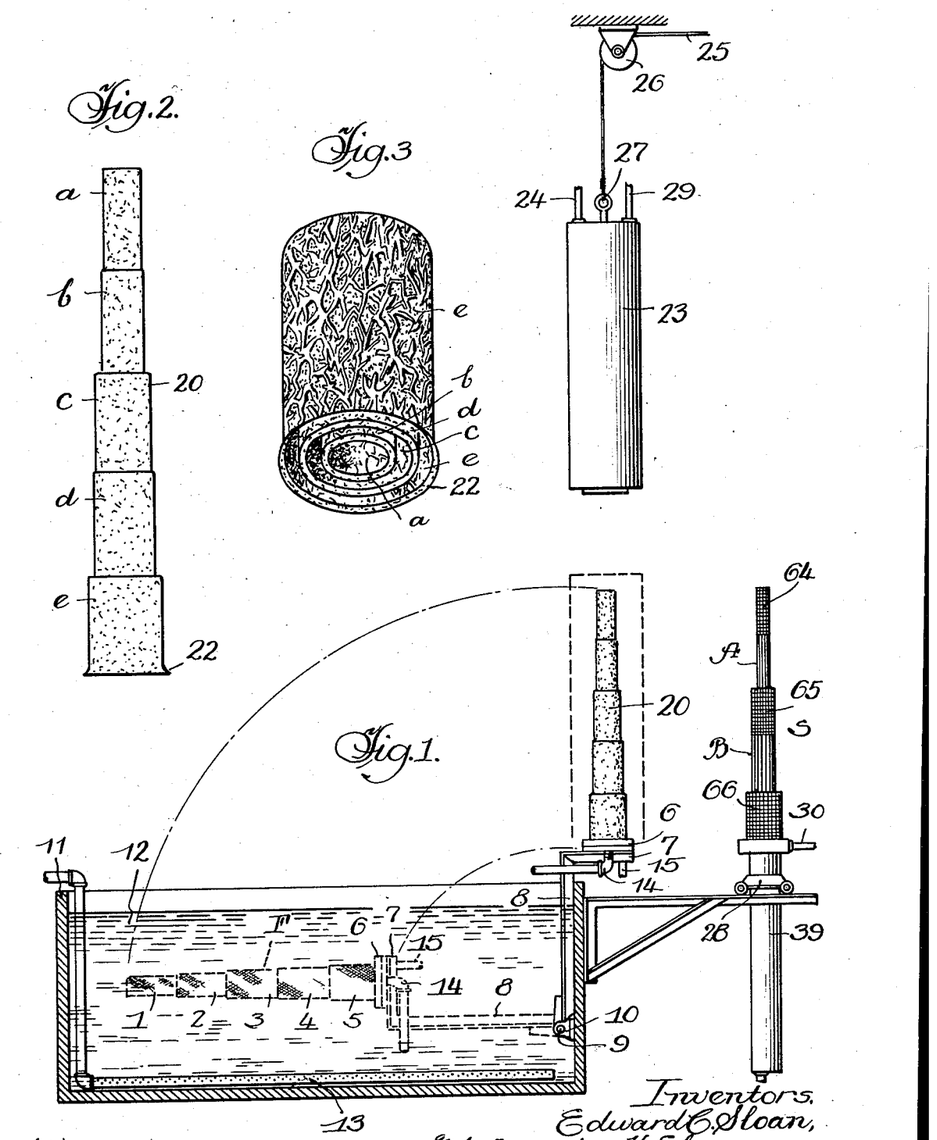
Fig. 1 is a more or less diagrammatic vertical cross-section through the pulp bath tank and showing in general the apparatus for making our novel fibrous pulp oil filter members.
Fig. 2 is a side elevation of the wet accreted carcass before being folded into finished shape.
Fig. 3 is a perspective view of a filter member made in accordance with our invention.

Referring more in detail to the drawings, it will be seen in Fig. 1 that in one embodiment of our invention we provide a felting form F which is formed of a plurality of tubular portions 1, 2, 3, 4 and 5 of any suitable cross-sectional shape, and each tubular portion from 1 to 5, respectively, being of greater diameter than the one preceding the same. In other words, these tubular sections 1 to 5 each increase in diameter respective to the one preceding it from the free end of the felting form to the base 6. The base 6 of felting form F is securely fastened by bolts or other suitable means to a plate 7 angularly formed on the free end of the supporting arm 8, which latter is suitably pivoted at 9 to the lug 10 fixed to one of the side walls of the tank 11, which tank contains a fibrous bath 12. This bath consists of the fibrous material being used immersed and thoroughly mixed in a suitable proportion of water.

The ratio of the amount of pulp to the amount of water may be varied as desired for the particular product being made, but we have found in making filter elements for oil filters that one-tenth of one per cent of fibre stock to ninety-nine and nine-tenths per cent of water by weight has given very satisfactory results. The fibrous material will, of course, be thoroughly mixed with the water in the tank either before or after being added to the tank as desired, and the bath is sufficiently agitated to maintain the fibrous material thoroughly mixed with and dispersed in the water.

One means of such agitation is shown in Fig. 1 as a compressed air pipe 13 extending across the bottom of the tank with openings in the pipe through which the compressed air will be forced to keep the bath agitated. Any suitable number of these pipes may be used across the bottom of the tank as desired, or the bath may be agitated by any other suitable means such as mechanical agitators, means for vibrating the tank, etc. Extending through the bottom of the closing plate 7 is a suction pipe 14 and an air pipe 15. Suction will be applied to the interior of the felting form F through pipe 14 to suck or draw the water through the perforated walls of the felting form and deposit the fibres of the bath upon the felting form walls to any desired thickness, which thickness can be controlled by various factors such as the amount of fibres in the bath, the degree of suction used, the length of time in the bath and the type of stock used. The walls of the felting form are provided with a large number of openings which may be covered with any suitable material for preventing the pulp from passing therethrough, such as fine mesh, wire cloth or the like. We have found very suitable results obtained by covering the perforated felting form with sixty mesh copper cloth, which copper cloth will extend entirely over the outer surface of the felting form and across the small closed end but not across the open large end, which is mounted and secured in a water-tight manner against the closure plate 7. A longitudinal cross-section through this felting form is shown in Fig. 4, in which the tubular portions 1, 2, 3, 4 and 5, as well as the closed end 16, are formed with a large number of openings 17, over which is placed a covering of wire mesh cloth 18 to prevent the pulp from passing through said openings.

Figures 4, 5:
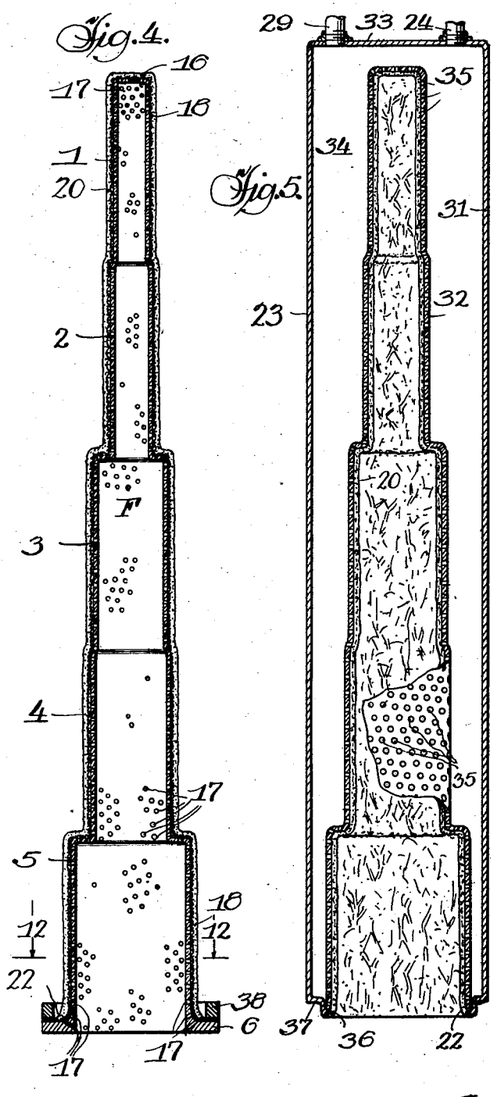
Fig. 4 is a longitudinal vertical section taken on a median plane of one of our filtering forms and showing the wet fibrous carcass accreted thereon.
Fig. 5 is a longitudinal vertical section taken on a median plane through the transferrer and showing the wet carcass on the inner surface thereof after having been removed from the felting form and prior to its application upon the folder.

The felting form F is shown in Fig. 4 with the wet carcass 20 after being felted thereon and just before removal therefrom by the main transferrer 23. The base or lower portion of the wet carcass, as seen in Fig. 4, is formed with the basal flange 22, which flange, as pointed out later herein, is used for clamping the filter element in position in the filter casing. The felting form, the transferrers and the folder of our invention may be made of brass, copper or other suitable material, preferably a material that will be rust resistant.

Referring again to Fig. 1, as soon as the felting form has been in the bath a sufficient length of time to receive the desired thickness of fibre deposits thereon to form a carcass of suitable thickness, the felting form F with the accreted fibres thereon, is swung upwardly around fulcrum 9 out of the bath and into the vertical position shown in solid lines. The position of the felting form in the bath is shown in dotted lines. As soon as the felting form F with carcass 20 accreted thereon has reached the vertical position referred to above, the main transferrer 23 (shown in detail in Fig. 5) is lowered thereover and an air suction created therein through the suction pipe 24 in order to hold the carcass 20 in gripping engagement with the transferrer and tend to release it from the felting form. This release from the felting form is further assisted by blowing air into the felting form through the air pipe 15, after which the main transferrer 23 is raised upwardly away from the felting form to remove the carcass from the latter and permit the felting form to again be swung downwardly into the bath to have formed thereon a carcass. The transferrer 23 may be raised and lowered by any suitable means, we, for illustrative purposes only, having shown in Fig. 1 a cable 25 passing over pulley 26 and secured at 27 to the transferrer 23. Any suitable power may be applied to the cable 25 to raise and lower the same as desired. We also wish it understood that any other suitable and adaptable form of means for raising and lowering the transferrer may be used without departing from the spirit of our invention.

In the foregoing it is to be understood that as soon as the fibres have been accumulated on the exterior of the felting form to the desired thickness, the suction through pipe 14 will be maintained until the felting form with its wet carcass thereon has moved out of the bath so as to prevent the deposited fibres from being washed away from the felting form. As soon as the felting form has moved out of the bath the suction through pipe 14 will be stopped, or if it is desired to remove more of the water from the carcass on the felting form the suction may be continued somewhat longer, but it is essential that before the transferrer 23 after being applied to the wet carcass is moved upwardly to remove the carcass from the felting form, the suction must have been cut off and, if desired, some air pressure applied as referred to above.

The felting forms F may be arranged in batteries of any desirable number in order to speed production. A corresponding battery of transferrers 23 with a transferrer for each felting form will likewise be provided for removal of the wet carcasses from the felting forms and to transfer them to the folders. After the felting form F (or battery of felting forms) has again been lowered into the bath the folder S is moved on its carriage 28 to the left as viewed in Fig. 1, so as to come directly under its corresponding transferrer 23. If a plurality of transferrers and felting forms are used, a corresponding number of folders will likewise be used for obvious reasons. As soon as the folder S is directly under the transferrer 23, the latter will be lowered onto the folder and when the wet carcass is in place therein the suction through pipe 24 of the transferrer will be cut off and a desired amount of air pressure will be introduced into the interior of the transferrer through air pipe 29, and at the same time suction will be applied to the interior of the folder through suction pipe 30. The transferrer 23 will then be raised to its elevated position in Fig. 1, the wet carcass at the same time remaining on the folder S to be folded as later herein described.

The main transferrer 23, as shown in Fig. 5, comprises the outer shell 31 and the inner shell 32, and the end wall 33, to form between the walls 31, 32 an air space 34, to which are connected suction pipe 24 and the air pipe 29, so that upon selective and individual manipulation of these pipes the space 34 within transferrer 23 may have applied thereto either a suction or air pressure as desired, the suction being to facilitate removal of the wet carcass from the felting form and the air pressure being to facilitate removal of the wet carcass from the transferrer to the folder. The inner tubular wall 32 of the transferrer 23 is formed with a suitable number of openings 35, so that the suction or air pressure within chamber 34 will be effective upon the wet carcass in either removing it from the felting form by suction or placing it upon the folder by air pressure. The lower end of the transferrer 23 is suitably formed at 36 to fit over and press out smooth the basal flange 22 of the wet carcass and at 37 with an inset shoulder and depending portion to fit over and within the ring 38 on the lower end of the felting form F, ring 38 serving as a guide for the lower end of the transferrer.

Figure 6:
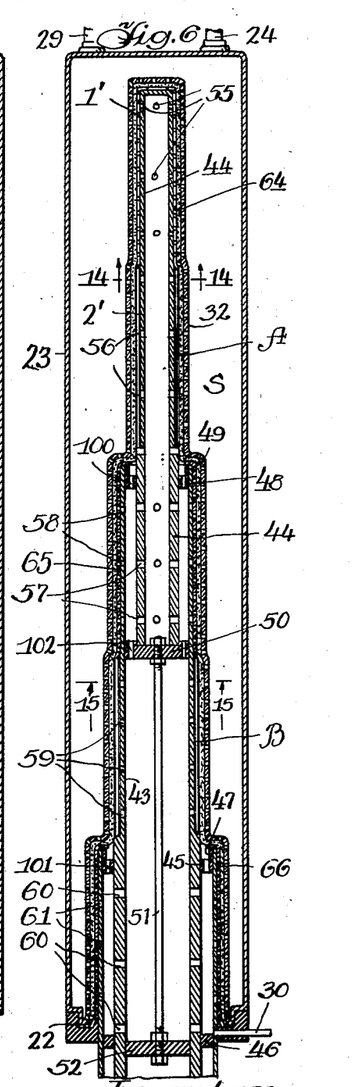
Fig. 6 is a fragmentary longitudinal vertical section taken on a median plane through the folder of our invention and showing the carcass applied thereto by the transferrer, but omitting for conservation of space the lower portion of the folder and showing the folder in its extended position prior to the folding operation.
Figure 7:
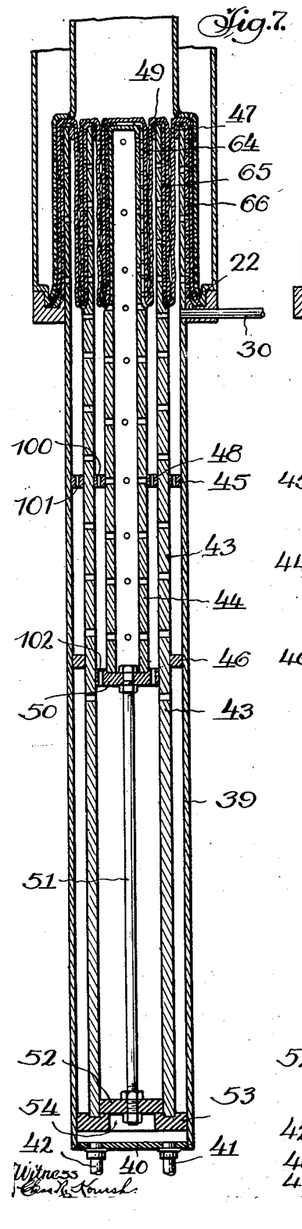
Fig. 7 is a longitudinal vertical section of the folder including the lower portion omitted from Fig. 6, and showing the movable parts of the folder and the carcass in the position and condition occupied after the folding operation has been effected and with the transferrer still in position around the folded carcass.
Figures 8, 9, 10, 11:
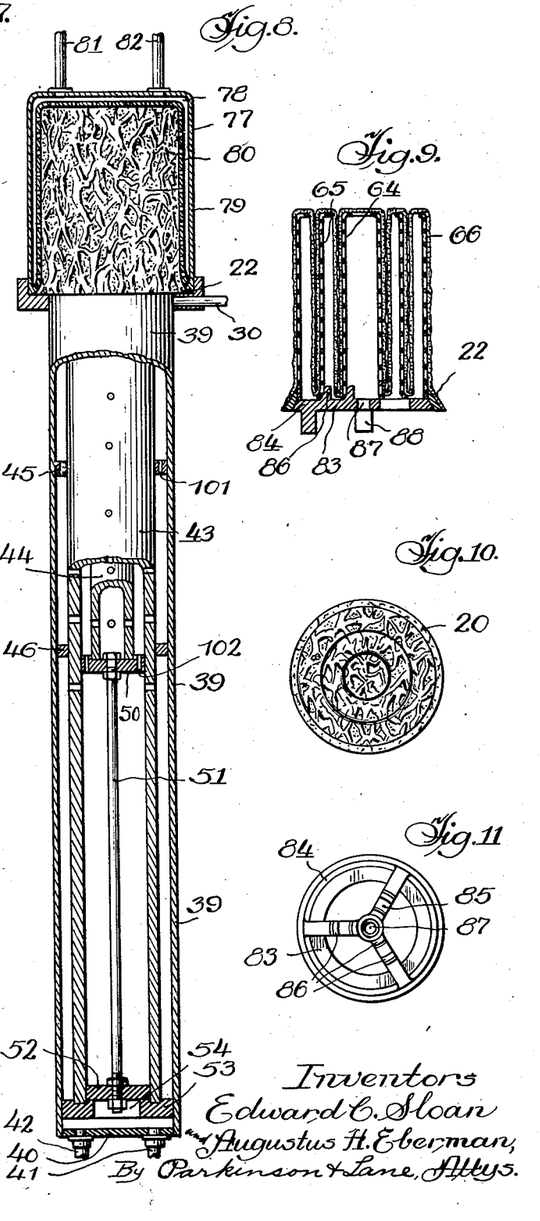
Fig. 8 is a view partly in side elevation and partly in section of the parts shown in Fig. 7, with the transferrer of Fig. 7 removed and a second transferrer in position over the folded carcass for removing the same from the folder.
Fig. 9 is a vertical section taken on a median plane through the folded carcass and showing the drying forms in position therein and the carcass and drying forms in position upon the centering plate.
Fig. 10 is a plan view looking down upon the top of Fig. 9 either before or after drying.
Fig. 11 is a plan view looking down upon the centering plate.

The folder S is shown in detail in Fig. 6, except that the lower portion of the same has been omitted for convenience, this lower portion, however, being shown in each of Figs. 7 and 8. In describing this folder reference will be made to Figs. 6, 7 and 8, in which the folder is shown as comprising a lower outer casing 39 closed at its lower end by end wall 40, through which extend the air pipe 41 and suction pipe 42. Slidably mounted within outer casing 39 is the intermediate tubular section 43, within the latter of which in turn is slidably mounted the inner hollow tubular section 44. Fixed to outer surface of the intermediate section 43 are the two spaced apart rings 45 and 46, the outer edges of which have a snug sliding fit with relation to the inner surface of the outer casing 39. These rings are spaced apart such distance that when the intermediate section 43 is extruded as far as it will go, the upper edge of ring 45 will contact the annular flange 47 fixed to the interior of the upper end of the outer casing 39, and when this contact takes place the upper edge of ring 46 will be just below the open inner end of suction pipe 30 as seen in Fig. 6.

When ring 45 contacts flange 47 the upper end portion of the intermediate section 43 will have protruded above the top of the outer casing 39 a distance equal to the length of the tubular stepped portions 3 and 4 of the felting form F. At the same time under the air pressure introduced through air pipe 41, the inner section 44 of the folder will have been extruded until the upper edge of ring 48 will have contacted the lower edge of annular flange 49 formed on the interior of the upper end of the intermediate section 43, and the inner section 44 has protruded a distance equal to the length of the tubular portions 1 and 2 of the felting form. Ring 48 is fixed to the exterior of the inner section 44 and has a snug sliding fit with the interior of the intermediate section 43. Also fixed to the bottom end of the middle section 44 is a circular end plate 50, the outer edges of which have a snug sliding fit with the inner walls of the intermediate section 43. Securely fixed to end plate 50 by means of suitable nuts and threads on each side of plate 50, is the rod 51, which at its lower end is fixed to the piston 52 by a nut threaded to rod 51 on each side thereof. It will thus be seen that the two elements 50 and 52 are rigidly connected together for simultaneous endwise movement and serve as two piston heads slidably mounted upon the interior of the intermediate member 43.

The lower end of the intermediate tubular member 43 has fixed thereto an annular plate member 53, the outer edge of which has a snug sliding fit with relation to the inner walls of the outer casing 39. Plate 53 has an opening 54 in its central portion to receive the lower nut on rod 51, and also permit the passage of air therethrough to move piston head 52 upwardly when air pressure is introduced through pipe 41, and to move the same downwardly when suction is applied through pipe 42. Assuming the parts in the position shown in Fig. 7, the application of air pressure through pipe 41 will force piston head 52 with the inner member 44 and the plate 53 with the intermediate member 43 upwardly to extrude said inner and intermediate portions until rings 48 and 45, respectively, hit flanges 49 and 47, which will bring the parts into position shown in Fig. 6, and which position these parts occupy when the main transferrer 23 is introduced over the folder S to apply the wet carcass thereto as shown in Fig. 1.

In order to permit a desired amount of suction to be applied to the interior of the folder when the main transferrer 23 is applying the wet carcass thereto, suction is applied through the suction pipe 30 which, as noted in Fig. 6, is above the ring 46 and piston head 52, thus enabling this suction to be applied to the offset tubular sections corresponding to sections 1, 2, 3, 4 and 5, simultaneously with the application of the air pressure below plate 53 and piston head 52 to prevent the collapsing or lowering of the inner section 44 and the intermediate section 43 while receiving the wet carcass. To permit this suction through pipe 30 to be applied throughout the entire length in fully extended position from ring 46 to the upper end of inner section 44, the various parts are provided with a suitable number of openings through which the suction will to a sufficient degree act upon a wet carcass to hold it to the folder when transferred thereto from the transferrer 23.

While any suitable number of holes may be used as desired, we have found it very satisfactory to provide approximately twelve 1/8 inch diameter holes 55 through the walls of the upper smallest section 1' of the inner section 44; approximately four 1/4 inch diameter holes 56 in each of the valleys of the fluted portion A; approximately twelve 1/4 inch diameter holes 57 in that portion of the lower end of inner section 44 falling below ring 48; approximately twelve 1/8 inch diameter holes 58 in that portion of the intermediate section 43 falling immediately opposite that portion of the inner section below ring 48 when extended; approximately four 1/4 inch diameter holes 59 in each of the valleys of the fluted portion B; approximately twelve 3/8 inch diameter holes 60 in that portion of the intermediate section 43 lying between rings 45 and 46; and approximately eighteen 1/8 inch diameter holes 61 in that portion of the outer shell 39 lying between flange 47 and ring 46 when the folder is extended. It is, of course, understood that these sizes and number of holes are only approximate and may be changed in number and dimension as desired within the limits of successful operation.

Figures 12, 13, 14, 15, 16, 17, 18, 19:
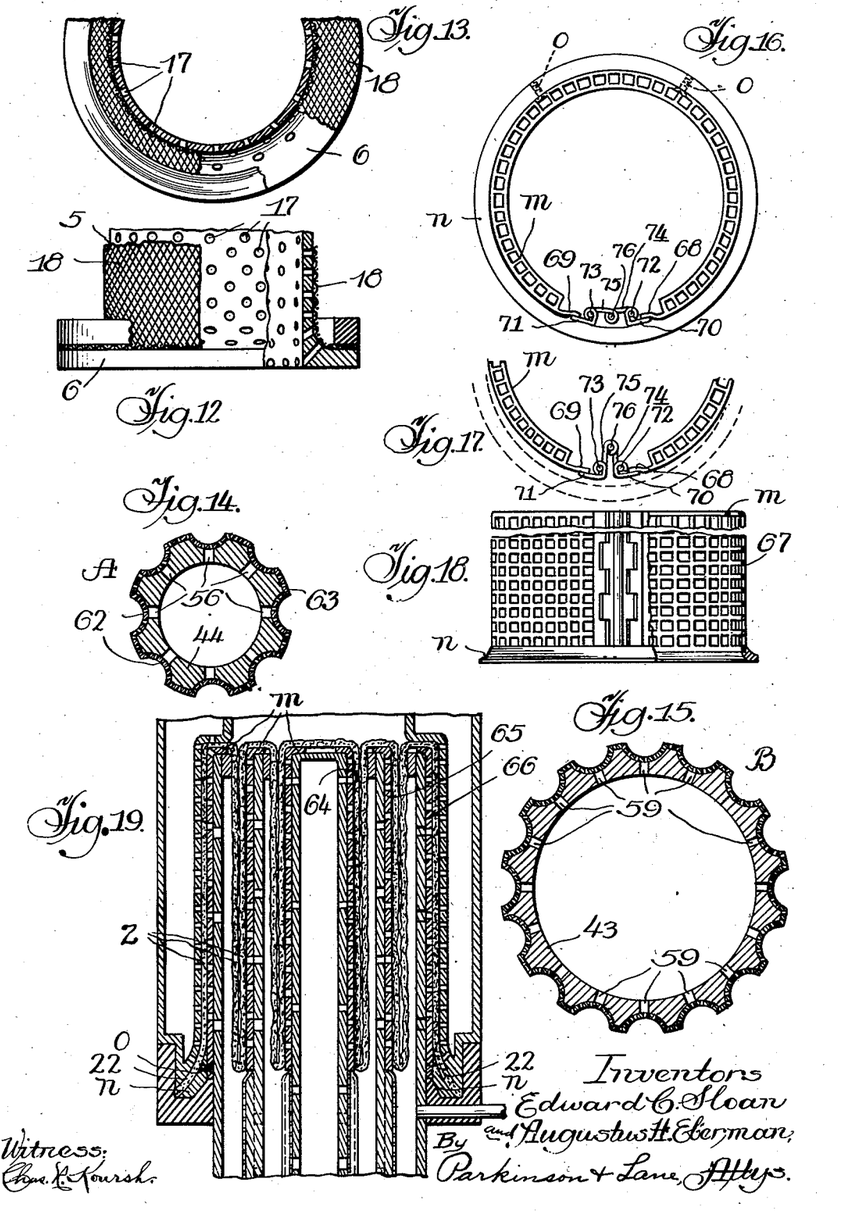
Fig. 12 is a fragmentary view partly in section of the lower portion of the felting form.
Fig. 13 is a fragmentary plan view of Fig. 12.
Fig. 14 is a horizontal transverse section taken on line 14—14 of Fig. 6 but through the folding form only.
Fig. 15 is a horizontal transverse section taken on the line 15—15 of Fig. 6 but through the folding form only.
Fig. 16 is a plan view looking down on the top of one of the drying forms in extended position.
Fig. 17 is a fragmentary plan view of the hinged portions of the drying form of Fig. 16 but showing the same in collapsed position.
Fig. 18 is a side elevation, partly in section and partly broken away, of Fig. 17.
Fig. 19 is a fragmentary vertical longitudinal section through the folder, folded carcass and lower portion of the transferrer, and showing the drying forms in position therein prior to removal of the folded carcass from the folder.

The fluted portions referred to are shown in cross-sectional detail in Figs. 14 and 15, Fig. 14 being a section on the line 14, 14 of Fig. 6 and Fig. 15 being a section on the line 15, 15 of Fig. 6. The fluted section of which a cross-section is shown in Fig. 14, is designated generally as A, and the fluted section of which a cross-section is shown in Fig. 15 is designated generally as B. These fluted sections are formed in the exterior face of the metal of the larger portion of the inner section 44 and the larger portion of the intermediate section 43, respectively, as indicated in Fig. 6, and are provided to assist in the stripping action when folding the wet carcass in the folder, to-wit, the stripping of the wet carcass from the adjacent faces of the folder during the folding action, which folding action will be better understood from an inspection of Figs. 6 and 19, Fig. 6 showing the wet carcass and associated parts of the folder before the folding operation begins, and Fig. 19 showing the folder and associated parts upon completion of the folding movement. Fig. 6 and Fig. 19 show the transferrer 23 as being still in position both before and after the folding operation, but this transferrer may, if desired, be removed and the folding operation take place after removal of this transferrer. This is a matter of choice and can be operated either way as desired.

Referring to Fig. 14, the fluted section A is provided with any suitable number of flutes or valleys 62, eight being shown in the drawings for illustrative purposes only, and this fluted section is covered with a thin perforated metal covering 63 or other suitable open-work material, preferably having a large number of small openings therein, it being remembered, as pointed out above, that openings are provided from the bottom of each of the valleys or fluted portions 62 to the interior of the inner telescoping section 44. The fluted section B being of a larger diameter will have a larger number of flutes or valleys, these numbering, as shown in Fig. 15, sixteen, this fluted section otherwise being formed and covered with perforated thin metal as described in connection with fluted section A in Fig. 14.

Due to the more or less fragile or crushable nature of the wet carcass after being folded, we prefer to provide perforated drying forms, which are shown in Figs. 7, 9, 16, 17, 18 and 19. Drying forms 64, 65 and 66, as seen in Fig. 9, are provided respectively for the inner, intermediate and outer concentric sections of the folded filter member. The construction of these drying forms is shown in detail in Figs. 16, 17 and 18 as comprising the cylindrical side wall of open mesh metal 67 having at its top the inturned flange m, the vertical edges 68 and 69 of the side wall having fixed thereto the angular portions 70 and 71, respectively, which angular portions carry the extending fulcrum pins 72 and 73, which in turn are fulcrumed to the plates or hinge members 74 and 75, which in turn are hinged together by means of the hinge pins 76. This hinged construction in effect forms a toggle and extends from the bottom to the top of these drying forms so that when the folded filter member is dried they may be easily removed therefrom by swinging hinge members 76 inwardly from the position shown in Fig. 16 to the position shown in Fig. 17, which will decrease the diameter of these forms and permit them to be withdrawn longitudinally from the folded and dried filter member. Also, if desired, they may be removed from the folded filter member while still wet. As shown, these drying forms are formed of metal having square openings, but this is merely for convenience and any shape or suitable size of such openings may be employed as desired.

As seen in Figs. 16–19, the drying form for the outer wall has a continuous bottom flange n with an outer face corresponding in inclination to the adjacent bottom edge of the wet carcass forming the supporting flange for the filter member. This bottom flange is secured by a pair of spaced screws, bolts or the like o to the bottom edge of the wall 67 of the drying form opposite the toggle hinges but free throughout the rest of its circumference to permit the drying form to move inwardly therefrom when being collapsed. The drying forms for the intermediate and inner portions of the wet folded carcass may have their lower edges straight as shown in Fig. 19, or slightly curved, if desired, as shown in Figs. 6, 7 and 9.

These drying forms are applied to those portions of the folder corresponding to sections 1, 3 and 5 of the felting form shown in Fig. 1 by slipping them longitudinally thereover. These drying forms thus applied are shown at 64, 65 and 66, respectively, in Fig. 6, before the wet carcass has been folded, and in Figs. 7, 9 and 19 after the wet carcass has been folded, and before the wet carcass has been removed from the collapsed folder in Figs. 7 and 19, and after such removal in Fig. 9. The wet carcass is preferably removed from the collapsed folder by a second transferrer 77, which has a hollow space 78 between its outer wall 79 and its perforated inner wall 80, to which hollow space air pressure may be introduced through air pipe 81 or suction through suction pipe 82. This transferrer 77 is of a shape and size to fit more or less closely over the exterior of the folded wet carcass after removal of the first transferrer 23, which latter, as stated above, may be removed either before or after the folding operation as desired.

In removing the folded wet carcass from the folder, suction through pipe 82 will be applied to the inner space 78 of transferrer 77, so as to make the exterior of the carcass adhere thereto, after which the carcass and transferrer will be lifted vertically upward to move the folded carcass and the drying forms together away from the folder, after which the wet carcass in the transferrer 77 will be lowered onto a centering plate 83, which, as shown in Fig. 11, is of spider formation having the exterior ring portion 84, which on its outer edge is outwardly and downwardly beveled as shown in Fig. 9, and which is provided with the radial arms 85, three or more in number as desired, which arms have the upstanding lugs 86, which are tapered on their outer faces to receive the correspondingly tapered lower ends of the drying forms. These centering plates insure that the several concentric cylinders of the filter member will be held properly in position and not permitted to become collapsed or distorted before drying. In the center of this centering plate may be provided an opening 87, if desired, to more freely permit heated air to enter the interior of the middle section of the folded filter member, air also freely passing upwardly into the interior of the intermediate and outer sections between the spider arms 85. These centering plates are provided with legs 88 so that they will stand up away from the carriage, table or other surface on which they may be resting during drying to permit free entry of air to the interior of the filter member while drying. If desired, these wet carcasses may be placed on an endless belt and have a continuous movement through the heated drying compartment.

The adjacent cylindrical walls contact each other back to back, as shown in Figs. 7, 9 and 19, and support each other during operation without any separate supporting means, their roughened surfaces providing intercommunicating depressions and valleys through which the oil, after it has passed through the filter, will flow and pass out from between these contacting walls. The same action will also occur between the outer wall of the filter member and the inner wall of the filter casing when they are in contact with each other.

The various steps in our improved method of forming our improved filter member will be readily understood from the foregoing, and will be seen in general to consist of first depositing by suction onto an elongated felting form a wet carcass of accreted, interlaced and integrated fibres having sections of stepped and varying diameter, and then moving such felting forms and wet carcass out of the bath to an upright position, and then applying over the wet carcass on the felting form a first transferrer, lifting the wet carcass from the felting form by such transferrer with the application of suction or pressure as desired, transferring the wet carcass to an extended folder and applying it thereto, and over which folder at certain sections have been applied open mesh drying forms, then collapsing the folder to fold the wet carcass into a plurality of integrally united concentric cylinders or other tubular forms, removing the first transferrer either before or after the folding operation, applying a second transferrer after the folding operation to the exterior of the folded wet carcass, then removing the second transferrer and the wet carcass and drying forms from the folder and transferring them to centering plates, and then placing said centering plates in drying chambers and drying the same to produce fibrous filter members having a plurality of concentric porous tubular portions for filtering liquids, and a flange whereby such filter may be readily clamped in position and in a filter casing, and after its usefulness has expired be readily removed therefrom and replaced by a new filter. The flange for clamping the filter member between suitable clamping portions in a filter casing is shown at 22 in Figs. 2, 3, 8, 9 and 19.

As seen in Figs. 2, 3, 6, 7 and 19, inner section $a$ of the wet carcass retains its original form and shape, and during the folding operation which, as is understood, is accomplished while the carcass is still wet, the folding occurs throughout the folding sections $b$ and $d$ so that in effect both of sections $b$ and $d$ are turned inside out so that section $b$ lies concentric with and outside of section $a$, section $c$ lies concentric with and outside of section $b$, section $d$ lies outside of and concentric with section $c$, and section $e$, forming the exterior of the filter member, lies concentric with and outside of section $d$, see particularly Figs. 2 and 3.

The extending of the parts of the folder may be accomplished, as stated earlier herein, by introducing air through air pipe 41, which will force plate 53 with its attached intermediate section 43, and piston head 52 and its attached inner section 44, upwardly until rings 45 and 48 strike flanges 47 and 49, respectively. By permitting the continuance of a certain amount of air pressure through air pipe 41, these parts will be held in extended position even while a greater or less suction is being applied through suction pipe 30 to assist in holding the wet carcass to the folder and freeing it from the interior of the first transferrer. To effect collapsing of the folder during the folding operation it is only necessary to stop the air pressure through pipe 41 and either utilize the weight of the telescoping parts or apply any desired amount of suction through pipe 42, to move the telescoping parts inwardly from the position shown in Fig. 6 to the position shown in Fig. 7, a slight amount of suction being maintained on suction pipe 30 or not as desired during this folding operation. We have, however, found it preferable to maintain a slight amount of suction on pipe 30 during folding. The suction from pipe 30 to the various sections of different diameter of the folder is made possible because of the inter-communicating openings between the various parts, as clearly seen in Fig. 6. For illustration, any suitable number of openings 100 will be formed in ring 48, also openings 101 in ring 45, and openings 102 in end plate 50.

The folder may be collapsed also when the main transferrer is still in place by introducing air pressure through pipe 29 into the space 34 within the transferrer to hold the wet carcass with more or less pressure against the folder and to force the telescoping parts into collapsed position. At the same time air is allowed to escape through suction pipe 30 and suction pipe 42, it being understood that during this time no air pressure will be introduced through air pipe 41.

We also wish it understood that, if desired, we will so treat the fibres or the wet carcass in such manner as to improve, either during the folding operation or after the folding operation or both, the wet-strength of the filter members. One way we accomplish this is by spraying the wet carcass after it is formed on the felting member and removed from the bath and before applying the transferrer thereto with a suitable solution, made as follows and in accordance with the following formula:

Dissolve 25 grams of urea (crystalline form) in 100 cc. of formaldehyde and heating the same to 212° F. and maintaining it at this temperature for thirty minutes and then allowing the same to cool. The resulting product we will term a neutral solution. We then mix 20 cc. of this neutral solution with 150 cc. of water and $\frac{1}{10}$ to 1% by volume of lactic acid (commercial 44% light technical).

With the above solution we spray the wet carcass while still on the felting form and then either apply heat to the carcass by means of introducing steam into the interior of the main transferrer after it has been placed over the carcass, or omit this heating step, if desired, as the heat may be applied later during drying of the filter members. The purpose of applying the heat immediately, if the same is done, is to accelerate the increasing of the wet-strength in order to obtain the benefits of the same during the folding operation.

We wish it understood, however, that with the use of many kinds of fibres this treatment for the increase of wet-strength will not be necessary, and the fibres of themselves will be when matted or felted of sufficient strength to permit the successful carrying out of the folding operation, as well as afford sufficient strength to the filter member after drying and when in use.

The wet-strength of our filter member may also be increased by choice of fibres in selecting such fibrous stock as to give the desired strength during folding and when the filter is being used. An example of some of such fibres is flax, jute, Manila fibres, and we wish it understood that we may also use any other fibres suitable for this purpose.

We may also, if desired, utilize any of the many other ways for increasing the wet strength of the fibrous structure of this invention. Whether increasing the wet-strength or not, it is always necessary to use such fibres as will maintain the interstices between the fibres to permit passage therethrough of the liquid being filtered.

Figure 20:
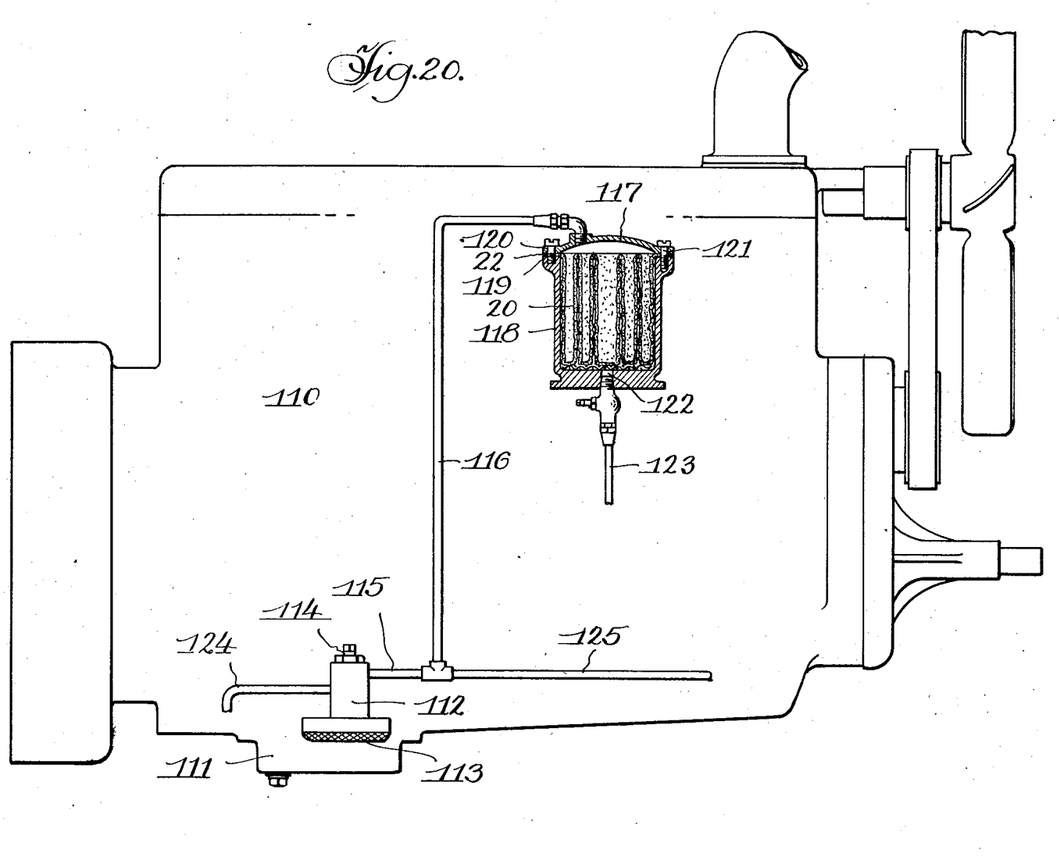
Fig. 20 is a more or less diagrammatic view showing the combination of our novel filter with the oil circulating system of an internal combustion engine.

One form of installation of our novel filter in combination with the oil circulating system of an internal combustion engine is shown more or less diagrammatically in Fig. 20, in which the engine shown generally at 110 is provided in the bottom of the crank case, or other desirable location outside of the crank case, with a sump 111 in the upper portion of which is positioned the oil pump 112 provided with the oil intake screen 113 and the oil pressure regulator 114. The oil pump is connected by piping 115 and 116 with the oil filter into the cover 117 of which said piping 116 leads to deliver the oil to be filtered above the filter member 20 which, of course, has been dried and completed. The filter member is securely held in position in the casing 118 by the top flange 22 being bolted tightly between complemental flanges 119 and 120 formed on the filter casing and cover, respectively, by means of bolts 121 or other suitable fastening means.

After passing through the filter member the filtered oil passes out through a metering orifice 122 and is returned through pipe line 123 back to the sump 111. In order not to be required to pass all of the oil through the filter the oil pump 112 is provided with the oil by-pass pipe line 124. Oil is conducted to the bearings to be lubricated through pipe line 125.

Figures 21, 22, 23, 24, 25:
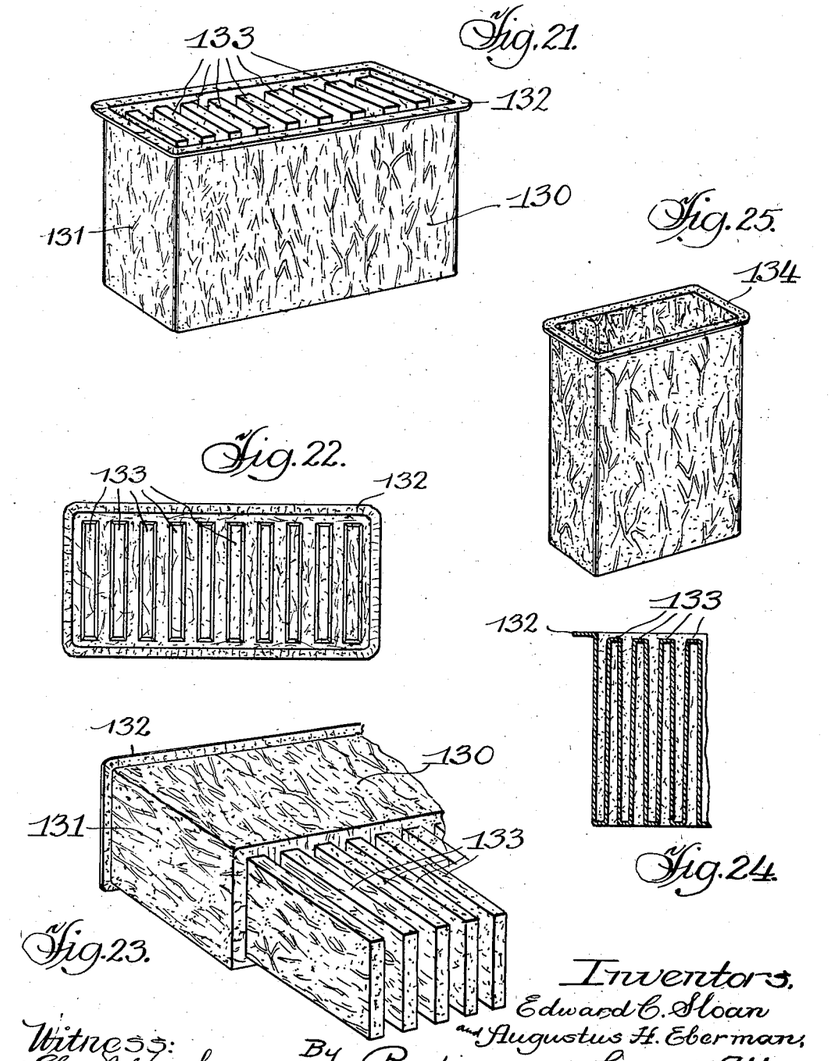
Fig. 21 is a perspective view of a modified form of our filter member in which the various interior sections are non-circular in cross-section and instead of being positioned one within the other are located alongside of each other.
Fig. 22 is a top plan view of the filter member shown in Fig. 21.
Fig. 23 is a fragmentary perspective view of the wet carcass from which the filter member of Fig. 21 is made but before the protruding sections have been folded to the inside of the main body portion or side walls.
Fig. 24 is a fragmentary vertical longitudinal section through one end wall and a portion of the interior sections of the filter member shown in Fig. 21.
Fig. 25 is a perspective view of a further modified form of filter member.

In Fig. 21 we have shown a modified form of filter member comprising the side walls 130, end walls 131, supporting flange 132, and interior hollow sections 133. In this modified form the wet carcass is accreted onto a form of the required shape and of the general construction as described in connection with the preferred form, except for such changes as will naturally occur due to the difference in shape. Without going into details as to the apparatus, the carcass is accreted, onto the form of the shape shown in Fig. 23, after which the protruding sections 133 are folded into the interior of the body portion by turning said sections inside out in a manner similar to that described earlier herein in connection with the preferred form and in apparatus operating in a similar manner. In the form shown in Figs. 21-24 the sections 133 instead of being positioned one inside of the other as in the preferred form are positioned side by side with suitable spaces therebetween and between the ends of the sections and the side walls of the body portion. The flange 132 will function for supporting the filter member within the filter casing in a manner similar to that described in connection with the preferred form. The form shown in Figs. 21-24 will also provide an extended filtering area, and the surfaces of the various members of this form of filter, such as the sections 133, the side walls 130 and the end walls 131, will be roughened from the accreting action to provide intercommunicating depressions or valleys similar to those described in connection with the preferred form. These intercommunicating valleys or depressions will, like the preferred form, permit the flow of oil or other liquid being filtered in a downward direction between the filter surfaces and the inner surface of the filter casing or any other surface against which the surface of the filter member may be in contact.

In Fig. 25 we have shown another form of filter member of a non-circular transverse cross-section, the surfaces of which will likewise have the roughened formation to form intercommunicating depressions or valleys to permit the flow of oil downwardly between the surfaces of the filter member and the inner wall of the filter casing in instances where the same are in contact with each other, thus providing a suitable support for the filter member without the addition of a separate or extraneous supporting member. The filter member shown in Fig. 25 may also be accreted onto a suitable form from a fibrous pulp bath. In the filter member shown in Fig. 25 there is also provided a supporting flange 134 for a purpose similar to that described in the preferred form. In use any suitable number of filter members of the type shown in Fig. 25 may be supported in a single filter casing, or if preferred, only one may be used and replaced by a new one as fast as required.

While we have shown the formation of intercommunicating valleys and depressions on the surfaces of the various portions of the filter member which occur as a result of the accreting action, these valleys or depressions may be in the form of longitudinal grooves extending throughout the height of the various surfaces which it is desired to place in contact either with each other or with the inner wall of the filter casing, which longitudinal grooves or valleys will function to permit passage of the filtered oil or other liquid between such contacting surfaces without the necessity of inserting extraneous supporting drainage means, such as wire mesh or other like materials.

We may also if desired add to the fibres in the felting bath an alkali such as sodium carbonate, sodium hydroxide or other suitable alkalies, by addition of from one to ten per cent by weight of the same to the fibrous pulp bath. The addition of such alkali to the fibres will neutralize such acid as may be present in the oil being filtered, and will also cause a swelling of the fibres in the bath so that the oil or other liquid being filtered will not swell the fibres during the use of the filter. The addition to the fibres of an alkali will also make the fibres more stable so that they will not become injuriously affected during the operation of the filter to lessen their efficiency. The addition of an alkali to the fibres may be used either jointly with the treatment of the fibres for increasing the wet strength of the filter members as described earlier herein or separately and alone without such treatment for the increase of the wet strength of the fibres. In other words, the treatment for increase in wet strength and the addition of an alkali to the fibrous pulp bath may both be used in the manufacture of filter members in accordance with our invention, or one or the other may be omitted as desired.

Another important feature of our invention, which is especially adapted for use in connection with the form of filter member shown in Fig. 25, but may also be used in such other connections wherever it may be adapted, is that immediately after the wet carcass is accreted onto the form in the desired thickness, the form and the wet carcass will be moved out of the bath and the wet carcass will be increased in size by air pressure from the interior of the form or suction onto the wet carcass from an exterior perforated member, such increase in size being gauged to be in amount such that after the wet carcass has been dried and shrinkage has occurred the filter member will be of a predetermined size. This increase in size, by air pressure or suction, of the wet carcass will also enable the wet carcass to be readily removed from the form without rupture. In other words, this increase in size of the wet carcass by air pressure or suction will permit ready removal of the wet carcass from the form and will be in amount such that the wet carcass during drying will shrink to a predetermined size, such predetermined size being that desired for the finished filter member. It will thus be seen that the size of the wet carcass will be increased by an amount equal to that necessary for the removal of the wet carcass from the form, plus the shrinkage of the wet carcass to a predetermined size.

From the foregoing it will be seen that we have provided a novel process and apparatus for producing a novel filter member of greatly extended area, made of fibrous pulp, seamless, integral, light and possessing sufficient strength to prevent collapsing or rupture of the parts during the filtering operation. Also we have eliminated the necessity for separate supporting elements to prevent collapsing of parts, by forming certain of the convolutions or folds substantially in contact with each other back to back so as to assist in supporting each other. The inherent roughness and irregularities in the faces of the various folds or surfaces is sufficiently great to insure that the oil will freely find ample passageways both between two filter walls that contact each other back to back as well as between a contacting filter wall and surface of the filter casing, such that the oil will freely pass from one side of the filter member to the other both between contacting parts as well as otherwise without separate supporting elements.

While we have shown and described herein certain embodiments and steps of our invention, we wish the same to be understood as illustrative only and not as limiting our invention in which said embodiments and steps are susceptible of modification and change without departing from the spirit of our invention.

Having now described our invention, we claim:

1. The process of forming a filter member which consists in accreting from a fibrous pulp bath an elongated wet hollow fibrous carcass so that said carcass is formed with a plurality of hollow sections circular in cross-section and integrally connected end to end with their interior spaces communicating and of progressively increasing size with the free end of the smallest section closed, and pushing certain of said sections while wet longitudinally into the next larger section to fold said sections one within the other and form a filter of a total length of one section, said sections being arranged in pairs, the sections of each pair being in contact with each other throughout substantially their length, and each pair spaced from the next pair, and then drying the folded carcass.

2. The process of forming a filter member of accreted, interlaced, integrated fibers, which consists in accreting from a fibrous pulp bath onto a porous felting former an elongated wet carcass having a plurality of hollow sections circular in cross-section and integrally connected end to end with their interior spaces communicating and of progressively increasing size with the free end of the smallest section closed, removing the wet carcass from the felting former, turning alternate sections inside out while wet so that said sections will be progressively surrounded one by the other from the center to the outside and form pairs of sections, the sections of each pair being in contact with each other throughout substantially their length, and each pair being spaced from the next pair, and then drying the same into rigid form, free of internal supports.

3. A filter member comprising a plurality of accreted fibrous hollow members folded one within another, the material of said members containing urea, formaldehyde and lactic acid for increasing their wet strength during folding.

4. A filter member comprising a plurality of integral accreted fibrous hollow members folded one within another, the fibres of said members having added thereto a solution of crystalline urea in formaldehyde and diluted with water and a small proportion of an acid for increasing the wet strength.

5. The process of making a filter member which consists in accreting onto a felting form from a fibrous pulp bath a hollow wet carcass having sections of different diameters, transferring said carcass from the felting form to a telescoping folder of similar shape, spraying said wet carcass either before or after said transference with a solution of crystalline urea in formaldehyde and this solution diluted with water and a small proportion of an acid for increasing the wet strength, collapsing the folder and thus turning certain of said sections inside out while wet, then removing the folded blank from the folder and drying the folded blank.

6. The process of making oil filter members which consists in forming a pulp bath of fibre stock and water, depositing fibres from said bath onto a form immersed in the bath to form a wet carcass, removing the form and wet carcass from the bath, then enlarging the lateral dimensions of the wet carcass so that it can be removed from the form, and drying said carcass, the size of the form plus the said enlargement being together larger than the final size by an amount equal to the shrinkage in drying, so that the filter member will be the proper size when dried to final form.

7. The process of making a filter member which consists in accreting onto a porous former from a fibrous pulp bath, a hollow tubular wet carcass having a plurality of sections in integral end to end relationship with their interior spaces communicating and of progressively increasing size with the free end of the smallest section closed, removing the wet carcass from the accreting former, then folding said sections one within the other while wet, and arranging said sections in pairs with the sections of each pair being in contact with each other throughout substantially their length, and each pair spaced from the next pair, and drying the thus folded carcass.

8. The process of making a filter member which consists in accreting onto a porous former from a fibrous pulp bath an elongated wet hollow tubular carcass having a plurality of sections integrally connected end to end with their interior spaces communicating and of progressively increasing size with the free end of the smallest section closed, folding the second section longitudinally inside of the largest section and at the same time carrying the third section longitudinally into the second section, folding the fourth section longitudinally inside of the third section and at the same time carrying the fifth section longitudinally into the fourth section, and forming a folded carcass of a length of one section with the sections arranged successively one inside of the other with the sections arranged in pairs, the sections of each pair being in contact with each other throughout substantially their length, and each pair spaced from the next pair, and then drying the folded carcass.

9. The process of forming a seamless filter member which consists in accreting onto a porous felting form from a fibrous pulp bath a hollow wet carcass having a plurality of hollow sections of progressively differing diameters from one end to the other, the sections being integrally connected end to end, the free end of the smallest section being closed, and the free end of the largest section being open, removing the wet carcass from the felting form, pushing each alternate section into the next larger section to fold such sections one within the other, so that the sections are arranged in pairs, the sections of each pair being in contact with each other, each pair being spaced from the next pair, and drying the folded carcass.

10. The process of forming a seamless member which consists in accreting onto a porous felting form from a fibrous pulp bath an elongated, wet carcass having a plurality of hollow sections of progressively differing diameters from one end to the other, the sections being integrally connected end to end, moving certain of the sections while wet, longitudinally into the next larger section to bring the sections one within the other with each section integrally joined to the next succeeding section at one end only so that the sections are arranged in pairs, the sections of each pair being in contact with each other, and then drying the folded carcass.

11. The process of making a filter member which consists in accreting onto a former in a fibrous pulp bath a hollow wet carcass of accreted, interlaced and integrated fibers, said former having sections in end to end relation and of progressively different diameters from one end of the former to the other, swinging the former and carcass out of the bath and into upright position with the smaller end of the carcass up, lowering onto the carcass on the former a transfer member having a hollow interior of a shape similar to the exterior of the wet carcass and of a size to receive the latter, causing the carcass to be released from the former and to adhere to the transfer member, raising the transfer member and carcass from the former and transferring the same to position over a longitudinally collapsible extended folder of an exterior shape similar to that of the inside of the carcass, lowering the transfer member and carcass onto the folder, causing the carcass to be released from the transfer member and to adhere to the folder, removing the transfer member from the carcass and folder, longitudinally collapsing the folder and pushing each alternate section of the wet carcass into the next larger section to fold such sections one within the other so that the sections are arranged in pairs, and drying the folded carcass.

12. The process of making a member which consists in accreting onto a former in a fibrous pulp bath a hollow wet carcass of accreted, interlaced and integrated fibers, said former having integral sections of progressively different diameters from one end to the other, moving the former and carcass out of the bath, applying to the exterior of the carcass on the former a transfer member having a hollow interior of a shape similar to the exterior of the wet carcass and of a size to closely receive the same, causing the carcass to adhere to the transfer member, removing the transfer member and carcass from the former and applying them over an extended, collapsible folder whose exterior is of similar shape and approximately similar size as the interior of the carcass, removing the transfer member from the carcass and folder, longitudinally collapsing the folder and turning alternate sections of the carcass inside out to fold the sections one within the other so that the sections are arranged in pairs, and drying the folded carcass.

13. The process of making a filter member which consists in preparing a mixture of fibers and liquid, placing a porous former in the mixture, accreting a hollow wet carcass of fibers having integral sections of progressively different diameters from one end to the other, onto the former, removing the former and wet carcass from the mixture, removing the wet carcass from the former and placing it over an extended collapsible folder, collapsing the folder and turning alternate sections of the carcass inside out to fold the sections one within the other so that the sections are arranged in pairs, and drying the folded carcass.

EDWARD C. SLOAN.
AUGUSTUS H. EBERMAN.